(12) United States Patent  (10) Patent No.: US 7,170,415 B2
Forster  (45) Date of Patent: Jan. 30, 2007

(54) RFID TAGS WITH MODIFIABLE OPERATING PARAMETERS

(75) Inventor: Ian James Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 123 days.

(21) Appl. No.: 11/001,808

(22) Filed: Dec. 1, 2004

(65) Prior Publication Data

US 2006/0125641 A1  Jun. 15, 2006

(51) Int. Cl.
  *G08B 13/14* (2006.01)
(52) U.S. Cl. ............................ 340/572.4; 340/572.8; 340/572.9
(58) Field of Classification Search ............. 340/572.1, 340/572.4, 572.6, 572.7, 572.8, 568.1; 343/787, 343/895; 156/264, 299, 302; 428/40.1, 428/41.3
See application file for complete search history.

(56) References Cited

U.S. PATENT DOCUMENTS

| | | | |
|---|---|---|---|
| 6,019,865 A | 2/2000 | Palmer et al. | |
| 6,787,208 B2* | 9/2004 | Galovic | 428/40.1 |
| 6,927,738 B2* | 8/2005 | Senba et al. | 343/787 |
| 6,940,408 B2* | 9/2005 | Ferguson et al. | 340/572.7 |
| 6,951,596 B2* | 10/2005 | Green et al. | 156/264 |
| 2003/0075608 A1 | 4/2003 | Atherton | |
| 2003/0169153 A1 | 9/2003 | Muller | |
| 2004/0119593 A1 | 6/2004 | Kuhns | |

FOREIGN PATENT DOCUMENTS

| EP | 1 132 859 A2 | 9/2001 |
|---|---|---|
| FR | 2 784 083 A | 4/2000 |
| JP | 11 053656 A | 2/1999 |

OTHER PUBLICATIONS

International Search Report for corresponding PCT/US2005/042955, mailed Apr. 19, 2006, completed by J-W Geiger of the EPO.

* cited by examiner

*Primary Examiner*—Van T. Trieu
(74) *Attorney, Agent, or Firm*—Tarolli, Sundheim, Covell, & Tummino LLP

(57) ABSTRACT

A radio-frequency identification (RFID) tag includes a facestock and a liner. The facestock includes an RFID circuit with an operating parameter, and the liner is releasably attached to the facestock such that when the liner is detached from the facestock, the operating parameter of the RFID circuit is desirably modified. The RFID tag may be configured so that the operating parameter that is modified is, for example, a read range or a propagation direction. The RFID circuit may include an RFID chip and an antenna, and the liner may include an electrical element that modifies a read range of the RFID circuit when the liner is attached to the facestock. More specifically, the electrical element may electrically couple with the antenna when the liner is attached to the facestock, thereby reducing the read range of the circuit. When the liner is removed, the antenna is decoupled from the electrical element and thereby enabled to operate at another read range, i.e., a specified operating range. Alternatively, the electrical element may couple with the antenna of the RFID circuit so that energy is propagated from the element in a direction that is orthogonal to a normal direction of propagation of the antenna.

33 Claims, 12 Drawing Sheets

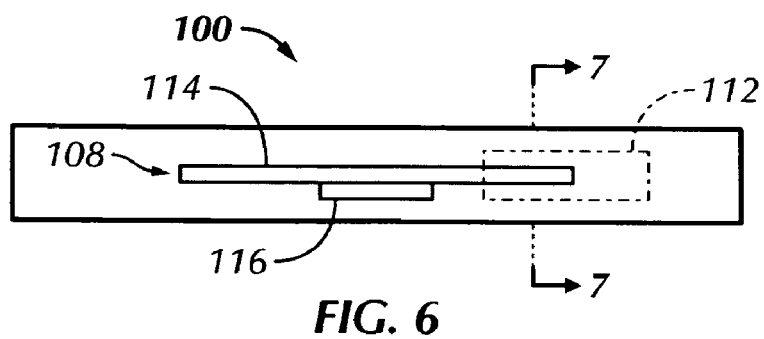
FIG. 6
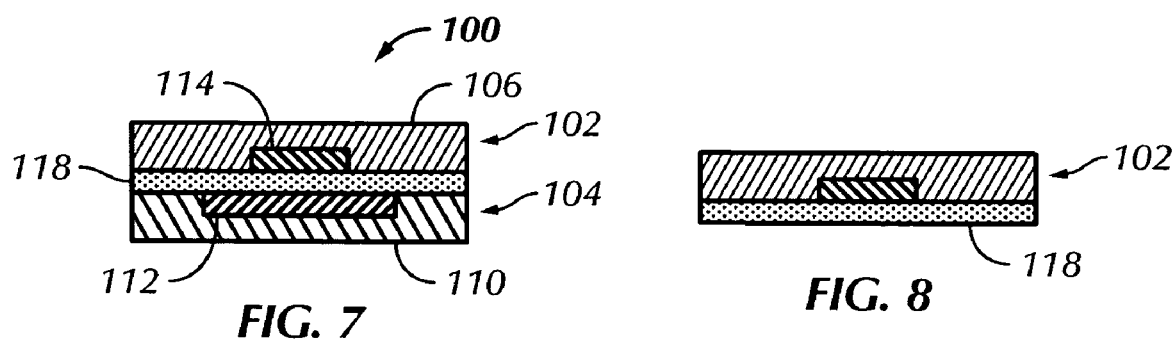
FIG. 7
FIG. 8
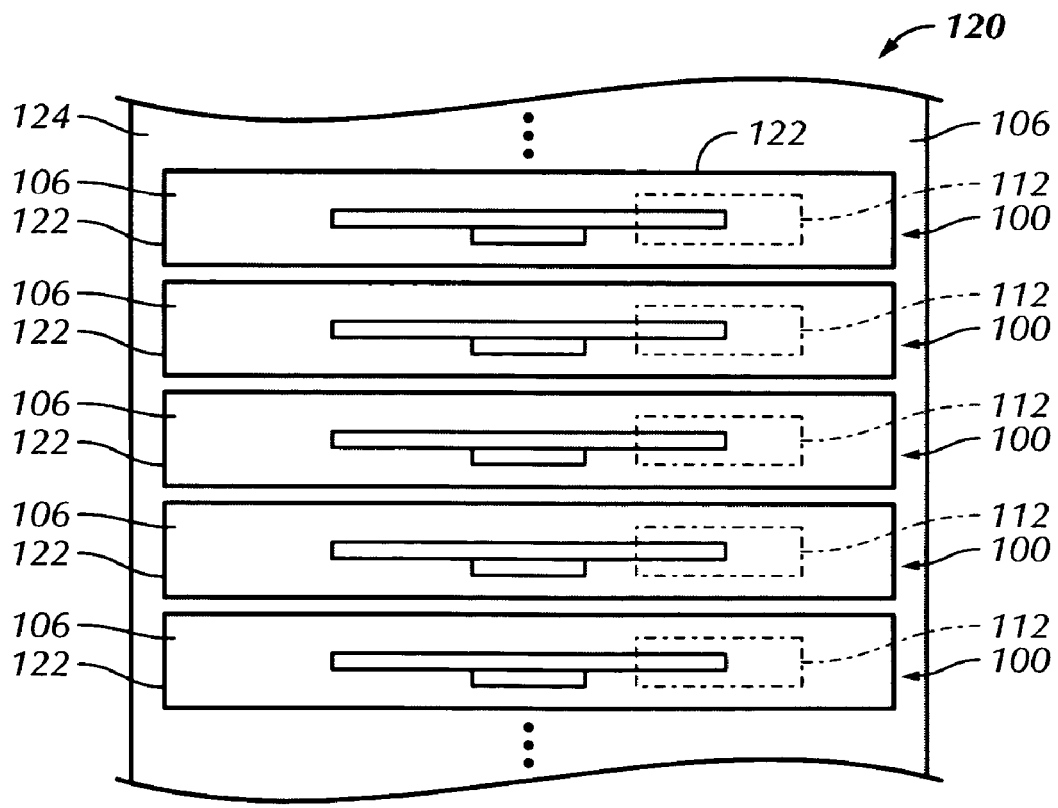
FIG. 9

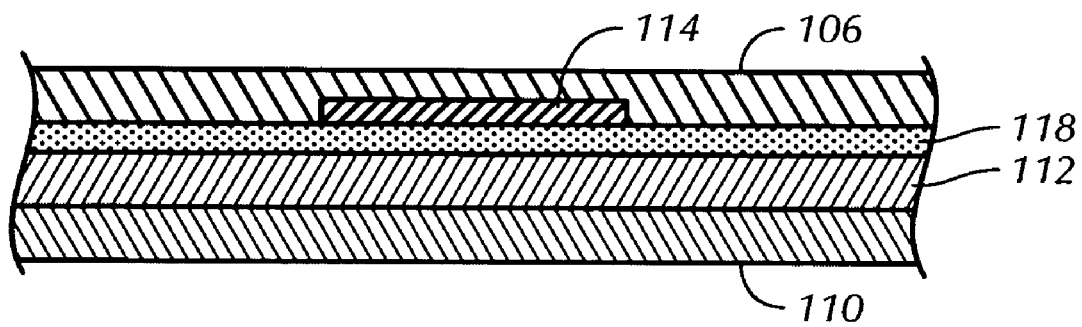
FIG. 9B1
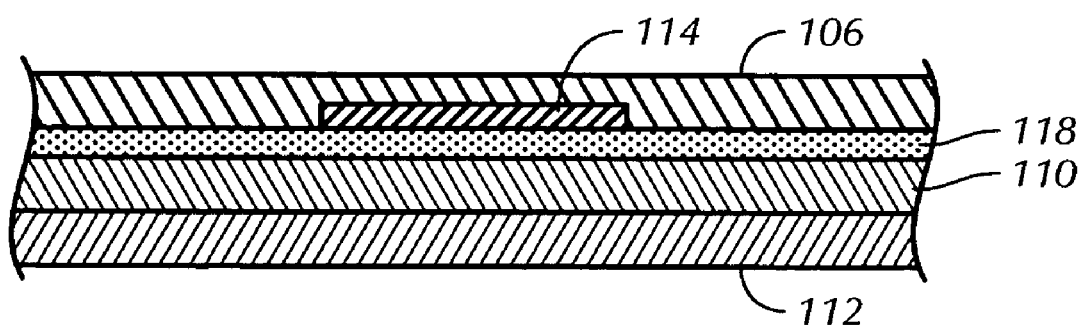
FIG. 9B2

RFID TAGS WITH MODIFIABLE OPERATING PARAMETERS

BACKGROUND OF THE INVENTION

The present invention relates to radio-frequency identification (RFID) tags. The invention also relates to RFID apparatus and methodology that enable the RFID tags to operate with multiple read ranges and/or that enable tags to have their operating characteristics modified.

Automatic identification is the broad term applying to a host of technologies that are used to help machines identify objects. Automatic identification is often coupled with automatic data capture. Therefore, companies wanting to identify items are able to capture information about the items, to store the captured information in a computer, and to retrieve selectively the information from the computer for a variety of useful purposes, all with minimal human labor.

One type of automatic identification technology is radio-frequency identification (RFID). Radio-frequency identification is a generic term for technologies that use radio waves to automatically identify objects. There are several conventional methods of identifying objects using RFID, the most common of which is to store a serial number (and other information, if desired) that identifies a product on a microchip that is attached to an antenna. The chip and the antenna together define an RFID transponder circuit. The antenna enables a remote reader that has a transceiver to communicate with the chip, and enables the chip to transmit identification information back to the reader when actuated to do so by the reader. The reader converts the radio waves returned from the RFID tag into a form that can then be utilized by a computer.

RFID tags are often produced in rolls or sheets of tags, in which the tags are spaced closely together. In certain applications it is desirable to read each of the tags prior to further processing, for example, to check the operability of the tags. Because the tags are closely spaced, there is a certain degree of cross coupling between the tags which diminishes the effectiveness of the reading operation. In other applications, it is desirable to read a tag from a direction that is orthogonal to the normal propagation direction of the tag. However, the antenna of the circuit may not be configured to effectively receive energy from such orthogonal directions.

In view of the foregoing, there is a need in the art for an RFID tag with a simple, inexpensive mechanism by which certain parameters of the tag, for example, its read range and/or its orthogonal readability, can be selectively altered between two desired states.

BRIEF SUMMARY OF THE INVENTION

In accordance with exemplary embodiments of the present invention, simple and inexpensive RFID apparatus and methodology are provided that enable RFID tags to operate with multiple read ranges and/or that enable the operating parameters of such tags to be selectively modified.

According to one aspect of the invention, a radio-frequency identification (RFID) tag includes a facestock and a detachable liner. The facestock includes an RFID circuit with an operating parameter, and the liner is releasably attached to the facestock such that when the liner is detached from the facestock, the operating parameter of the RFID circuit is desirably changed.

In one of the many possible embodiments thereof, the RFID tag may be configured so that the operating parameter that is modified is a read range. For example, the RFID circuit may include an RFID chip and an antenna, and the liner may include an electrical element that modifies a read range of the RFID circuit when the liner is attached to the facestock. More specifically, the electrical element electrically couples with the antenna when the liner is attached to the facestock, thereby reducing the read range of the circuit. When the liner is removed, the electrical element is decoupled from the antenna, thereby enabling the antenna to operate at another read range, i.e., a specified operating range. For example, a coupled read range may be less than about 1 meter, and a decoupled read range may be at least about 2 meters.

In other embodiments, the RFID tag may be configured so that the operating parameter that is modified is a direction of propagation. For example, the electrical element may couple with the antenna of the RFID circuit so that energy is propagated from the element in a direction that is generally orthogonal to its normal direction of propagation. In these embodiments, the RFID tags may be particularly useful when the tags are being read in, e.g., a printing operation. The RFID tags may advantageously be configured as roll labels for commercial applications or as sheet labels for consumer applications.

Alternatively, the liner may modify the coupling characteristics of the antenna to a specific coupling structure in an RFID-enabled printer or label applicator. Examples of the coupling characteristics that may be modified include coupling strength, signal level, and coupling frequency. For example, the signal level at which the RFID tag receives the RF signal from a reader may be controlled. In addition, the frequency at which the tag couples efficiently to the reader coupling structure may also be controlled. The control or modification of these characteristics enables tags designed to operate in free space at one frequency band, for example the band from 902 MHz to 928 MHz under FCC part 15 in the United States, to be read and programmed in a printer operating at a frequency allowed in Europe, for example, in the band from 869.4 MHz to 869.650 MHz under ETS 300-220, thereby facilitating international shipping of tagged objects.

Other features and advantages of the present invention will become apparent to those skilled in the art from a consideration of the following detailed description taken in conjunction with the accompanying drawings.

BRIEF DESCRIPTION OF THE SEVERAL VIEWS OF THE DRAWINGS

FIG. 6 is a plan view of an RFID tag according to other embodiments;

FIG. 7 is a cross-sectional view of the RFID tag of FIG. 6 taken along line 7—7 thereof;

FIG. 8 is a cross-sectional view of the RFID tag of FIG. 6 in the second read range;

FIG. 9 is a plan view of a roll of dual-state RFID tags according to a number of embodiments;

FIGS. 9B1 and 9B2 are cross-sectional views taken along line 9B—9B of FIG. 9A, respectively illustrating alternative embodiments;

DETAILED DESCRIPTION OF THE INVENTION

Figure 1:
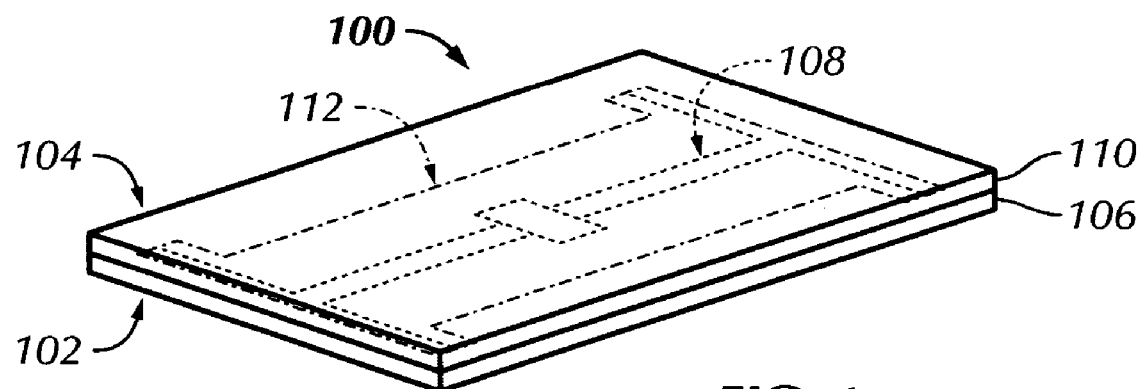
FIG. 1 is a perspective view of an RFID tag according to a number of embodiments, particularly illustrated the tag in a first read range.

Referring more particularly to FIG. 1 of the drawings, a radio-frequency identification (RFID) tag 100 is configured so that the tag has more than one read characteristic. For example, in a number of embodiments, the tag 100 may have both short-range read characteristics and long-range read characteristics. For the purposes of this description, an RFID tag with such multiple read-range characteristics may be described as a two-state, a dual-state, or a multi-state tag.

Figure 2:
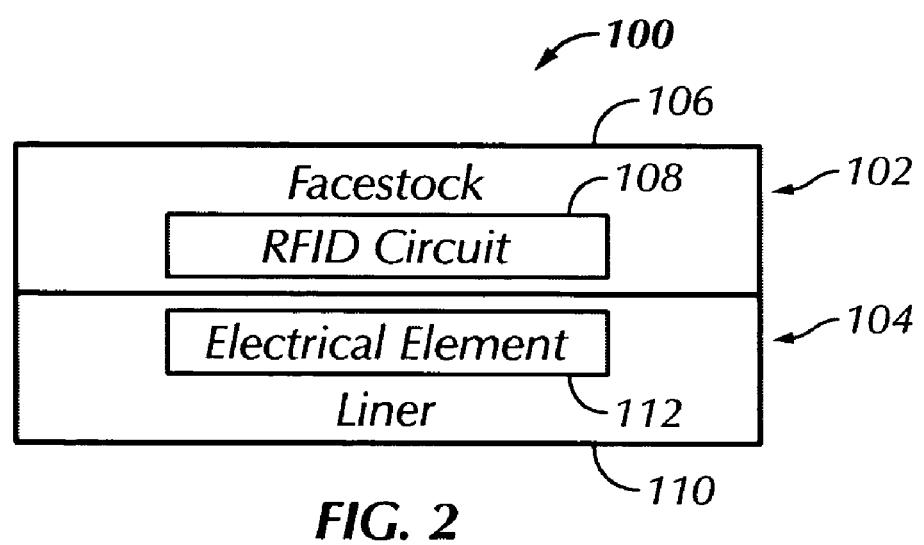
FIG. 2 is a block diagram of an RFID tag in the first read range.

Referring to the embodiments shown in FIGS. 1 and 2, a tag 100 may include a facestock 102 and a liner 104 releasably attached to the facestock 102. The facestock 102 may include a substrate 106 and an RFID circuit 108. The liner 104 may include a substrate 110 and an electrical element 112 for interacting with the RFID circuit 108 so as to modify an electrical characteristic or an operating parameter of the RFID tag 100.

The RFID circuit 108 can comprise an inlay 104 of a known type, i.e., a chip 116, containing an RF transponder electrically coupled to an antenna 114. The inlay may further include a strap assembly, i.e., an interposer electrically coupled to the chip, which is in turn coupled to the antenna. The electrical element 112 can comprise, for example, a pattern of a material having certain desirable electrical properties that is etched, printed, adhered, formed, or otherwise disposed on the surface of the liner 104, as illustrated in the figures.

Figure 3:
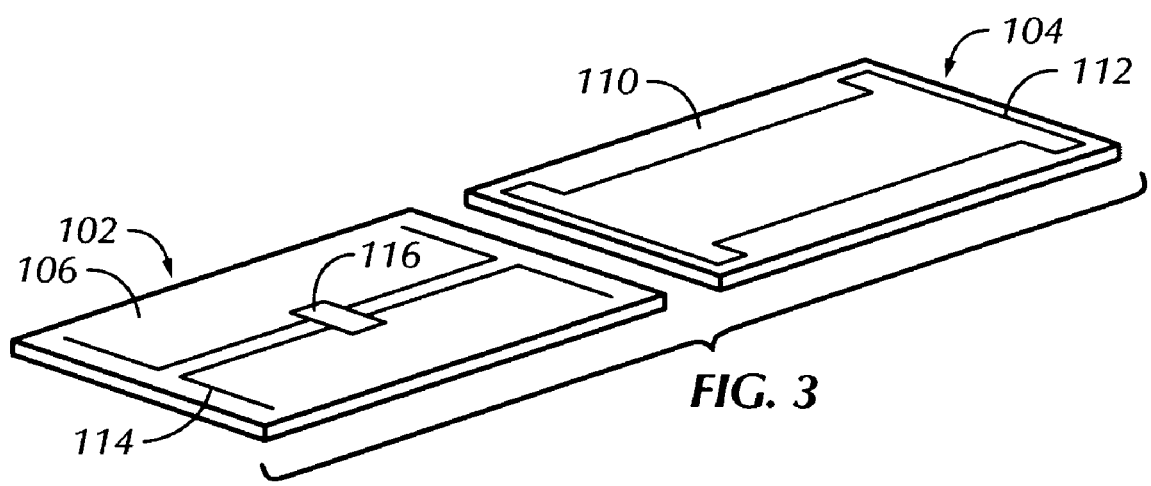
FIG. 3 is a perspective view of the RFID tag of FIG. 1, illustrating the tag in a second read range.
Figure 4:
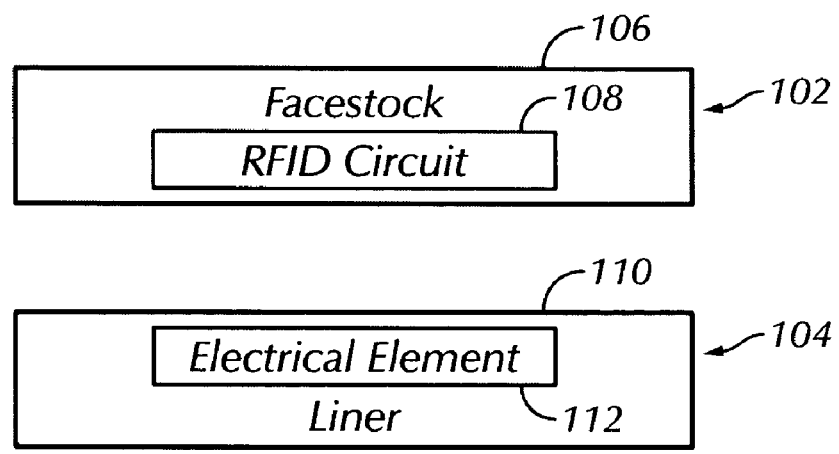
FIG. 4 is a block diagram of an RFID tag in the second read range.
Figure 5:
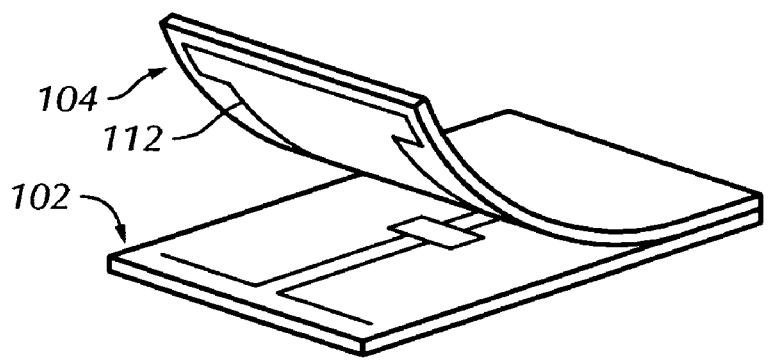
FIG. 5 is a perspective view of the RFID tag of FIG. 1 at an intermediate stage between the first and second read ranges.

More specifically, depending upon the configuration of the RFID circuit 108, the electrical element 112 can be configured to interact with the RFID circuit 108 so that the RFID tag 100 has a first read range when the liner 104 is attached to the facestock 102 as shown in FIGS. 1 and 2, and a second read range when the liner 104 is detached from the facestock 102 as shown in FIGS. 3 and 4. FIG. 5 illustrates an intermediate step in removing the liner 104 from the facestock 102 by peeling the liner away according to, e.g., embodiments with a layer of a non-curing, pressure-sensitive adhesive disposed between the facestock and the liner.

As used herein, the terms "tag" and "RFID tag" refer to an information medium that includes identifying and/or other information in an RFID device. Optionally, the facestock 102 may include other information such as visible information (e.g., printed indicia and/or graphics). Stock media is used for the tag 100 may be referred to as tagstock, which may include an adhesive layer, an intermediate layer, and a liner. A tag may be attached to objects using adhesive (such as pressure sensitive adhesive) or using other means such as mechanical fastening. A tag that incorporates adhesive for attachment to objects is often called a label. The liner may cover an adhesive layer of a tagstock until a tag or label is to be adhesively secured to an object, at which time the liner would be removed. Alternatively, the liner may be a removable layer of a tagstock that is not adhesively secured to objects. An example of the latter is a tagstock with a "dry peel" interface to a removable liner, as disclosed in U.S. Pat. No. 4,863,772, which patent is incorporated herein by reference. Still alternatively, water-based and hot-melt adhesives may be utilized when suitable to a particular application.

The facestock 102 may include one or more layers containing one or a series of RFID circuits. For example, the facestock 102 may include a printable surface layer, a release liner, and a series of RFID devices intermediate to the surface layer and the liner. Accordingly, the RFID devices are sometimes called inlays. Additional layers such as papers, films, foils, adhesives, and coatings may be included in the facestock 102 as known in the art, e.g., as described in United States Published Patent Application No. 2003/0136503 and in U.S. Pat. No. 6,451,154, the entire disclosures of which are incorporated herein by reference.

The tagstock used for the tags 100 may be in the form of rollstock or sheetstock, the latter of which can be produced by cutting sheets from rollstock. In the case of rollstock, the liner is often removed during automatic application of tags (or labels) to objects, e.g., by separation around a peel-back blade. In the case of sheetstock, the liner is often removed manually by users, e.g., by separation of printed labels after desktop printing. The present invention is operative to change an operating parameter of the RFID circuit in any of these embodiments: rollstock or sheetstock media, and automatic or manual separation of the liner.

Both the facestock 102 and the liner 104 of the tagstock may have an elongate axis, and the facestock 102 may include a series of RFID circuits arrayed along the elongate axis. The liner may include an array of electrical elements corresponding to the array of RFID circuits, and optionally these electrical elements may be located in registry with the corresponding RFID circuits. Alternatively, the liner 104 may incorporate a single, elongated electrical element that overlaps a portion of all of the RFID circuits, as described in more detail below.

In a number of possible embodiments, the first read range of the RFID tag 100 may be less than about 1 meter when the liner 104 is attached to the facestock 102, and the second read range of the tag 100 may be at least about 2 meters when the liner 104 is detached from the facestock 102. In other possible embodiments, the first read range of the tag 100 may be less than about 10 centimeters, and the second read range of the tag 100 may be at least about 4 meters. Examples of applications of tags 100 having these types of read ranges are provided below.

In a number of exemplary embodiments, the RFID circuit 108 may include an antenna 114 and an RFID chip 116. In these embodiments, the electrical element 112 may be configured to inhibit the energy of the RF signal that is to be radiated from the antenna 114 when the chip 116 is excited by activation energy from a reader, with the inhibiting taking place when the liner is attached to the facestock 102. For example, the electrical element 112 may include conductive material such as copper so that the electrical element 112 couples with the antenna 114 when the liner is attached to the facestock 102 to prevent RF energy from being radiated by the antenna 114. In other words, the electrical element 112 can be configured to selectively detune the antenna 114 when the liner is attached to the facestock 102.

In other embodiments, the electrical element 112 may include dielectric material such that the electrical element 112 insulates either the entire RFID circuit 108 from excitation energy, or the antenna 114 from radiating energy. One example of such a dielectric material is a ceramic-loaded ink that can be simply and inexpensively printed on the liner substrate in a desired pattern. Other examples of suitable dielectric materials may be found in *The Electrical Engineering Handbook, Second Edition* (Edited by Richard Dorf, CRC Press, 1997, pp. 1248–52).

In still other possible embodiments, the electrical element 112 may include materials having a high magnetic permeability. Examples of such materials include ferrites and certain metals that interact with the magnetic field produced by an RFID circuit 108, thereby selectively altering the operating characteristics of the circuit 108 in a desired manner. For example, when exposed to a magnetic field above a certain level, ferrite can become saturated, whereupon the relative permeability drops nearly to 1. Accordingly, by utilizing a DC field, a printer can switch the interaction of the printed ferrite of the electrical element 112 on the liner 104 between ON and OFF states. By performing this switching, the printer can selectively control the amount of coupling, i.e., the amount of RFID power coupled into the antenna of an RFID device required to write data to it.

With additional reference to FIGS. 6 and 7, a dual-state RFID tag 100 is shown according to other exemplary embodiments. As above, the RFID circuit 108 includes an antenna 114 and a chip 116 mounted to the facestock substrate 106, with an electrical element 112 mounted on the release substrate 110, examples of which are discussed in more detail below. As shown in FIG. 6, the RFID tag 100 is configured such that the electrical element 112 is spatially and operably juxtaposed with a portion of the RFID circuit 108, such as a portion of the antenna 114 as shown. Alternatively, as shown in FIG. 1, the electrical element 112 may be spatially juxtaposed with the entire RFID circuit 108. For purposes of this description, the terms "spatially juxtaposed" and "operably juxtaposed" are used to describe a parallel, overlapping, spaced relationship between the electrical element 112 and the antenna 116 in which the electrical element is able to modify an operating parameter of the antenna.

As shown in FIGS. 7 and 8, the liner 104 may be releasably attached to the facestock 102 with a layer of adhesive 118, such as pressure-sensitive adhesive. Accordingly, when the liner 104 is removed, the adhesive 118 is exposed, thereby enabling the facestock 102 with the RFID circuit 108 to be attached to an article.

Figure 10:
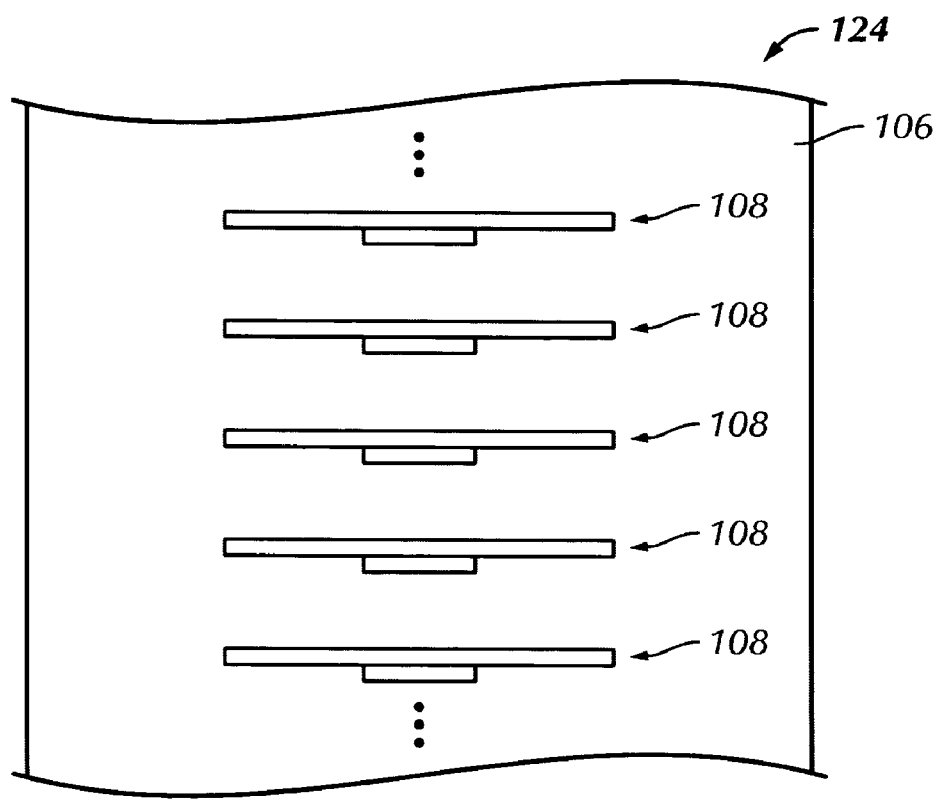
FIG. 10 is a plan view of a facestock web utilized for forming the roll of tags of FIG. 9.
Figure 11:
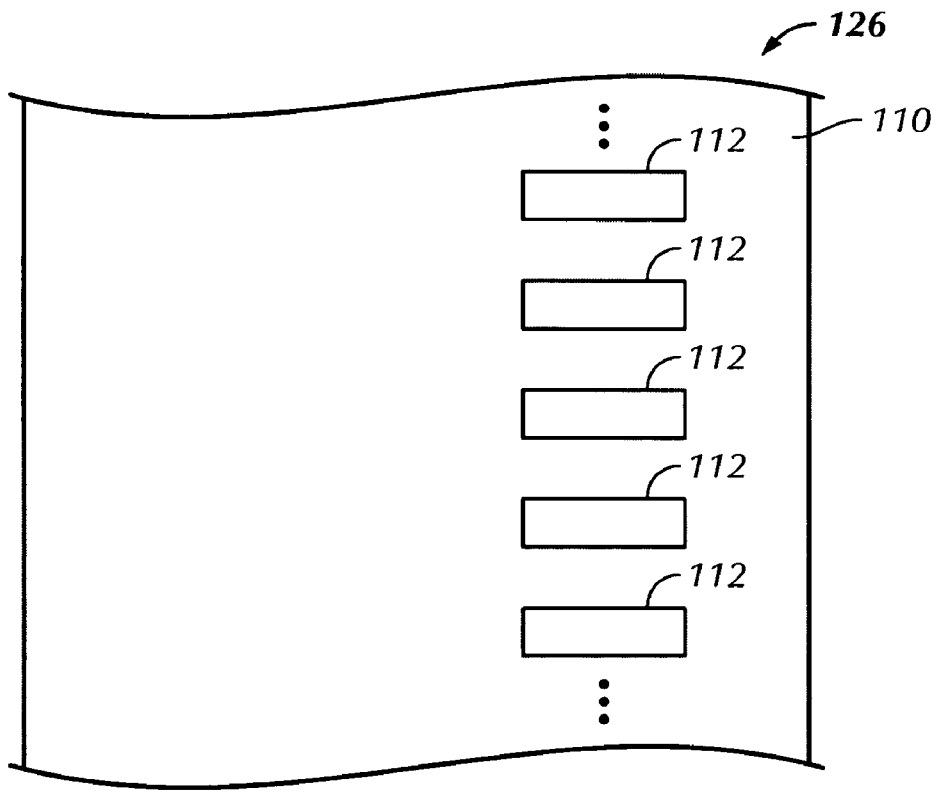
FIG. 11 is a plan view of a liner web utilized for forming the roll of tags of FIG. 9.

In manufacture, a plurality of the RFID tags 100 can be produced on a roll or sheet 120 as exemplified in FIG. 9. In these embodiments, a plurality of cuts 122, such as die cuts, can be made in a roll or web of facestock substrate 124 to form or define the facestock substrate 106 of each of the labels 100. With reference to FIGS. 10 and 11, during production a plurality of RFID circuits 108 may be applied to a roll or web of facestock substrate 124, and a plurality of electrical elements 112 may be applied to or formed on a roll or web of liner substrate 126. The webs 124, 126 may then be releasably attached together with the electrical elements 112 respectively spatially and operably juxtaposed with the RFID circuits 108, as shown in FIG. 9. Die cuts 122 can then be made in the web of facestock substrate 124 to define respective RFID tags 100. In other embodiments, the die cuts 122 can be extended through the web of liner substrate 126 as well to define individual RFID tags 100.

Figure 9A:
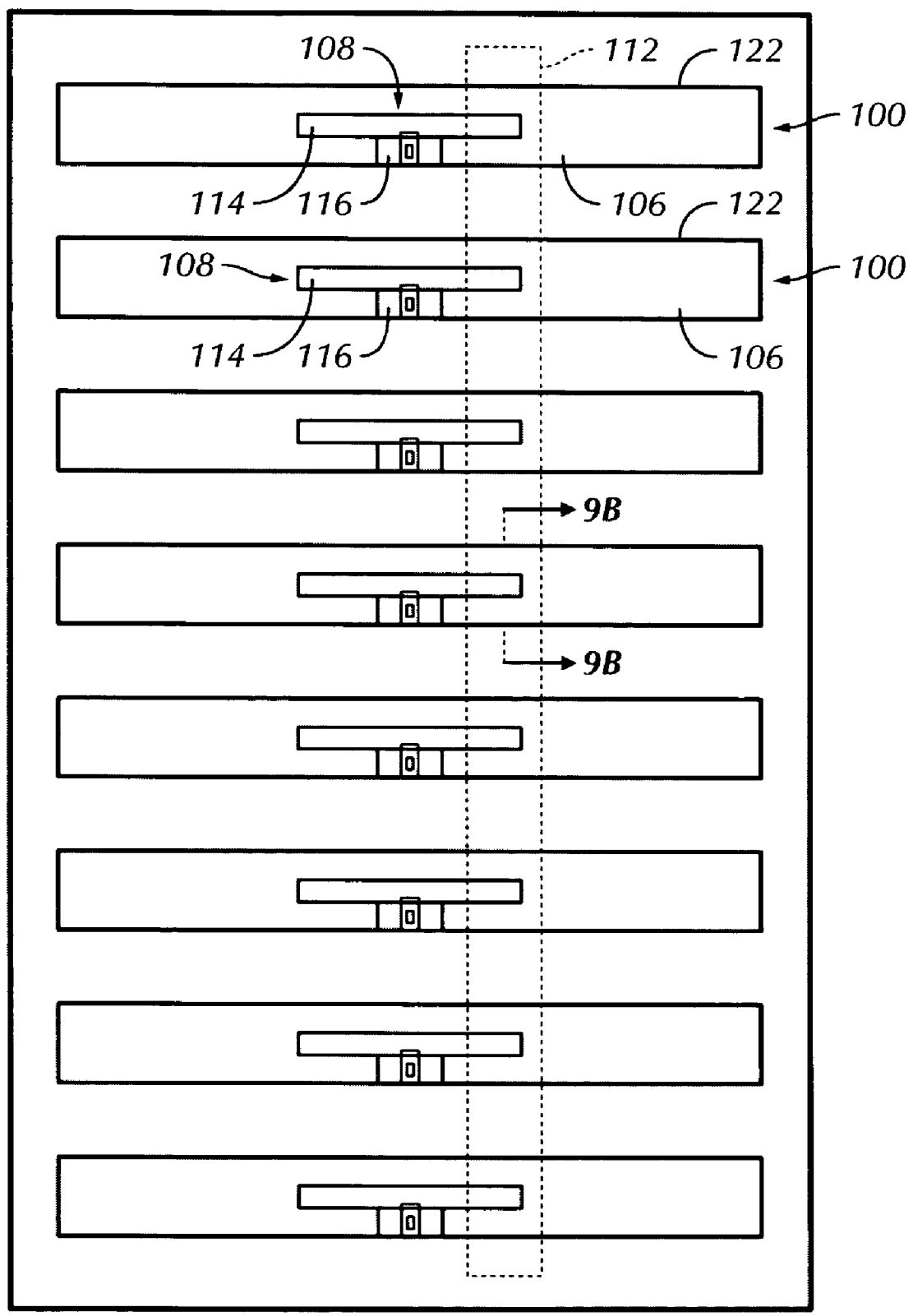
FIG. 9A is a plan view of a sheet of dual-state RFID tags according to other embodiments.

Alternatively, as shown in FIG. 9A, a plurality of the RFID tags 100 can be produced on a sheet 120 with a plurality of cuts 122 to form or define the facestock substrate 106 of each of the labels 100. In contrast to a plurality of electrical elements, in this embodiment a single elongate electrical element 112 may be applied to or formed on the liner substrate 126 (see FIG. 11). When the webs 124, 126 are releasably attached together, the electrical element 112 is spatially juxtaposed with the antenna 114 of each of the RFID circuits 108. As will be understood, in these embodiments, manufacturing tolerances can be loosened while still ensuring that there is accurate registration or spatial juxtaposition between the electrical element 112 and the antennas 114.

As shown in FIG. 9B1, the electrical element 112 may be a conductive layer of material sandwiched between the facestock substrate 106 and the release substrate 110. Alternatively, as shown in FIG. 9B2, the electrical element 112 may be an elongate conductive strip adhered or applied to an outer surface of the release substrate 110, such that the release substrate 110 is sandwiched between the electrical element and the facestock substrate 106. In these latter embodiments, the conductive strip may be a metallic Mylar® material or a reflective or silvery material.

Figure 12:
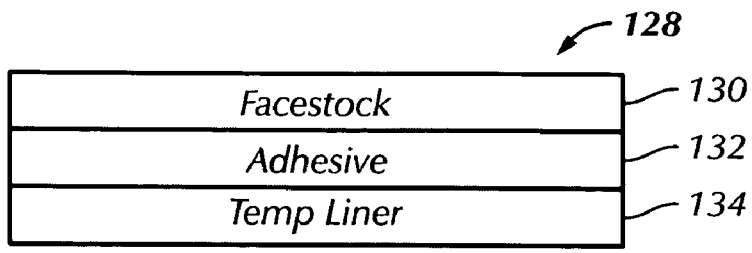
FIG. 12 is a cross-sectional view of a facestock web of some of the embodiments.
Figure 13:
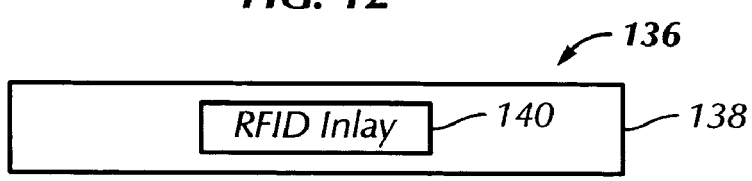
FIG. 13 is a cross-sectional view of an example of an inlay web.
Figure 14:
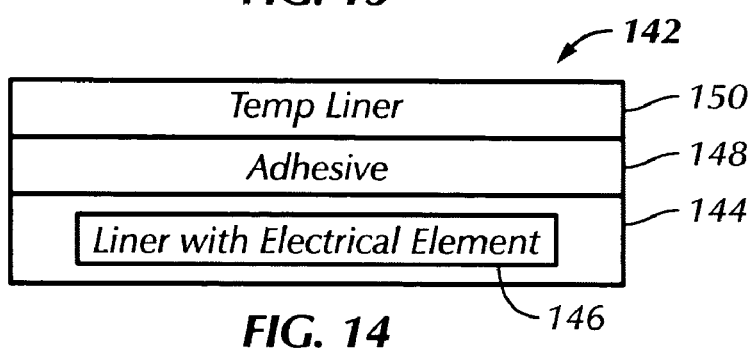
FIG. 14 is a cross-sectional view of a liner web according to some of the embodiments.

Discussing production embodiments in more detail, a roll 120 of RFID tags 100 can be produced by combining a plurality of webs. As shown in FIG. 12, a facestock web 128 can include a facestock substrate 130, an adhesive layer 132, and a temporary liner 134. As shown in FIG. 13, an inlay web 136 can include an inlay substrate 138 carrying a plurality of RFID inlays 140, each incorporating an RFID circuit 108. And as shown in FIG. 14, a liner web 142 may include a liner substrate 144 with an electrical inlay 146 including a plurality of the electrical elements 112, an adhesive layer 148, and a temporary liner 150.

Figure 15:
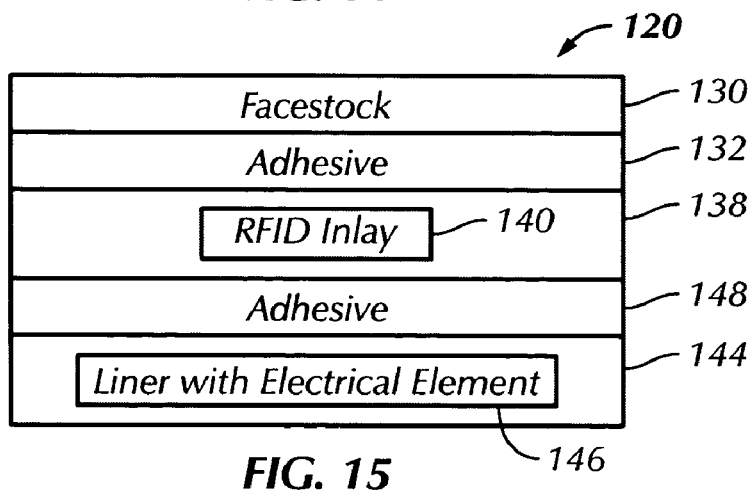
FIG. 15 is a cross-sectional view of facestock, inlay, and liner webs assembled together without temporary liners to form an RFID tag.
Figure 16:
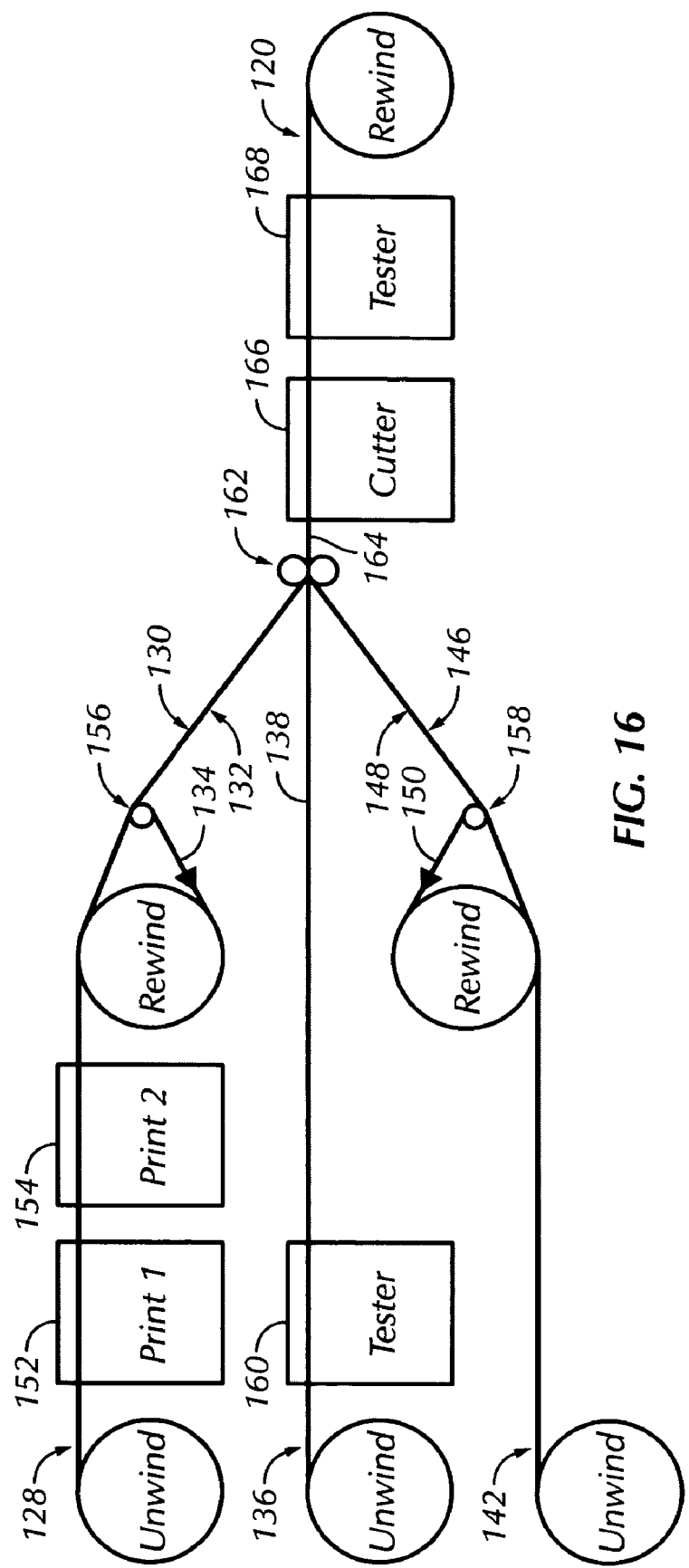
FIG. 16 schematically illustrates a production line utilizing the webs of FIGS. 12, 13, and 14.

With additional reference to FIGS. 15 and 16, a web of RFID tags 120 can be formed by unwinding the facestock web 128 and, if desired, passing the web 128 through one or more printers 152, 154 for printing identifying information on the facestock substrate 130. The temporary liner 134 can then be separated from the facestock substrate 130 (indicated at 156), thereby exposing the adhesive layer 132. The temporary liner 134 can then be rewound as shown for other uses if desired. Similarly, the liner web 142 can be unwound, with the temporary liner 150 being separated from the liner substrate 144 (indicated at 158), thereby exposing the adhesive layer 148. The temporary liner 150 may then be rewound as shown.

The inlay web 136 can be unwound and passed through a tester 160 for testing the RFID circuits 108 of the inlay 140. The inlay substrate 138 can then be sandwiched between the exposed adhesive layers 132 and 148, with the three substrates 130, 138, 144 being pressed together (indicated at 162 in FIG. 16). The inlay substrate 138 and the liner substrate 114 are configured and indexed with respect to each other during the pressing operation such that, when sandwiched together, the desired spatial or operable juxtaposition of the electrical elements 112 of the electrical inlay 146 with respect to the corresponding RFID circuits 108 of the RFID inlay 140 is achieved.

The raw web (indicated by 164) that results from this operation may then be passed through a cutter 166 to make die cuts (see, e.g., cuts 122 in FIG. 9) to form individual RFID tags 100 in the raw web 164. The cut web may then pass through a tester 168 to again test the operability of the RFID circuits 108. The resulting RFID tag web 120 that results may then be wound into a roll for shipment or further processing, which web 120 is illustrated in FIG. 15. Those skilled in the art will appreciate that the production line illustrated in FIG. 16 provides for the purposes of this description only one example of how the RFID tag web 120 may be produced. Other production apparatus and techniques may also be employed.

Figure 17:
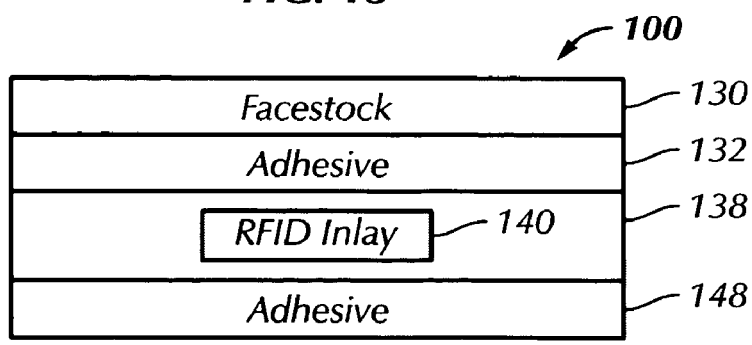
FIG. 17 is a cross-sectional view of an RFID tag with a liner substrate removed.

As described above, the RFID tags 100 of the web 120 are in a "near-field" state when the liner substrate 144 is attached to the adhesive layer 148 as shown in FIG. 15, and in a "far-field" state when the liner substrate is removed from adhesive layer 148 as shown in FIG. 17. With the liner substrate 144 removed and the adhesive layer 148 exposed, the far-field RFID tag may then be adhered to an object.

Figure 18:
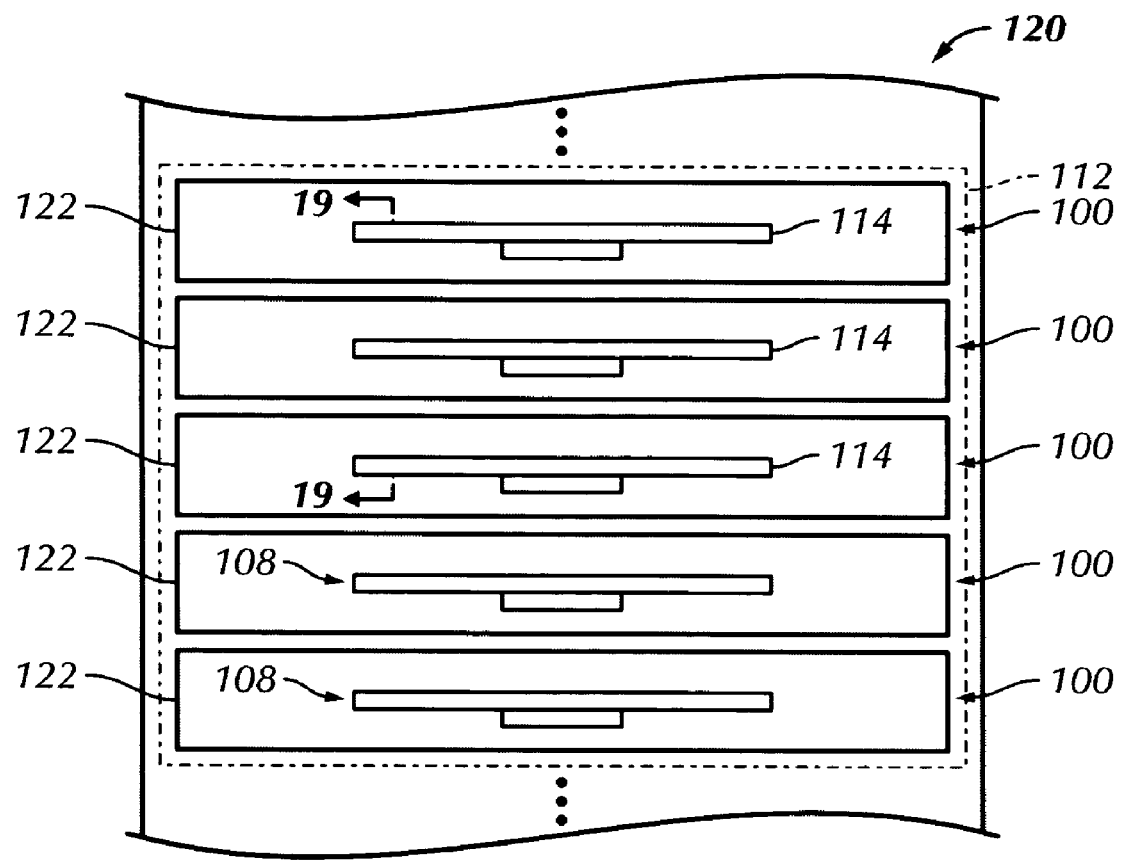
FIG. 18 is a plan view of a roll of close-pitched RFID tags with an electrical element for preventing cross coupling.
Figure 19:
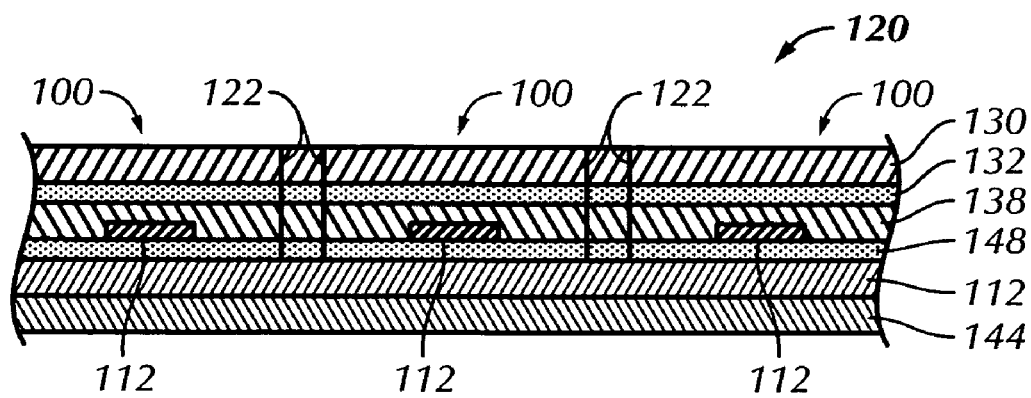
FIG. 19 is a cross-sectional view of the roll of tags of FIG. 18 taken along line 19—19.

With reference to FIGS. 18 and 19, in a number of possible embodiments, the electrical element 112 may be substantially coextensive with, or at least spatially juxtaposed with, each of the tags 100 of a roll of tags 120. More specifically, the electrical element 112 may be a layer of conductive ink that is printed on the liner substrate 144 so that each of the RFID circuits 108 is in a parallel, overlapping, spaced relationship with the electrical element 112. Accordingly, the electrical element layer 112 essentially couples electrically with all of the antennas 114 of the adjacent circuits 108 in the roll to prevent cross coupling between adjacent circuits 108.

The prevention of cross coupling between adjacent tags 100 can be very beneficial, especially in closely pitched rolls of tags 120. With the operating range reduced by the electrical element layer 112, the roll 120 can be interrogated in a reader/printer with essentially no error resulting from cross coupling.

FIG. 19 also illustrates die cuts 122 made through the facestock substrate 130, adhesive layer 132, inlay substrate 138, and adhesive layer 148 to form individual RFID tags 100. Accordingly, each of the tags 100 may be peeled out of or otherwise removed from the roll 120, with the electrical element layer 112 and the liner substrate 144 left behind in the roll web, thereby rendering the tag 100 in the far-field state.

Figure 20:
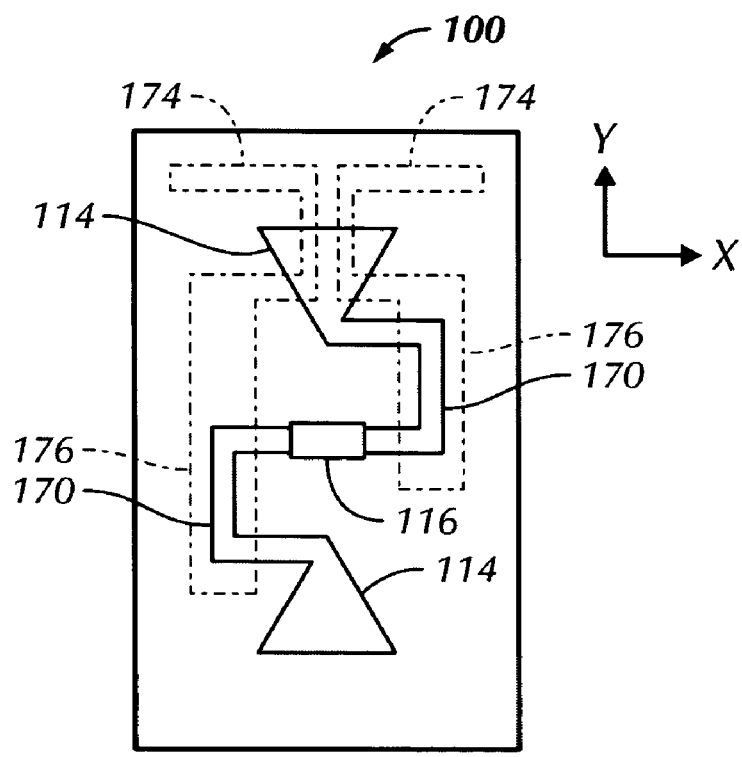
FIG. 20 is a plan view of an RFBD tag with enhanced orthogonal readability according to a number of embodiments.
Figure 21:
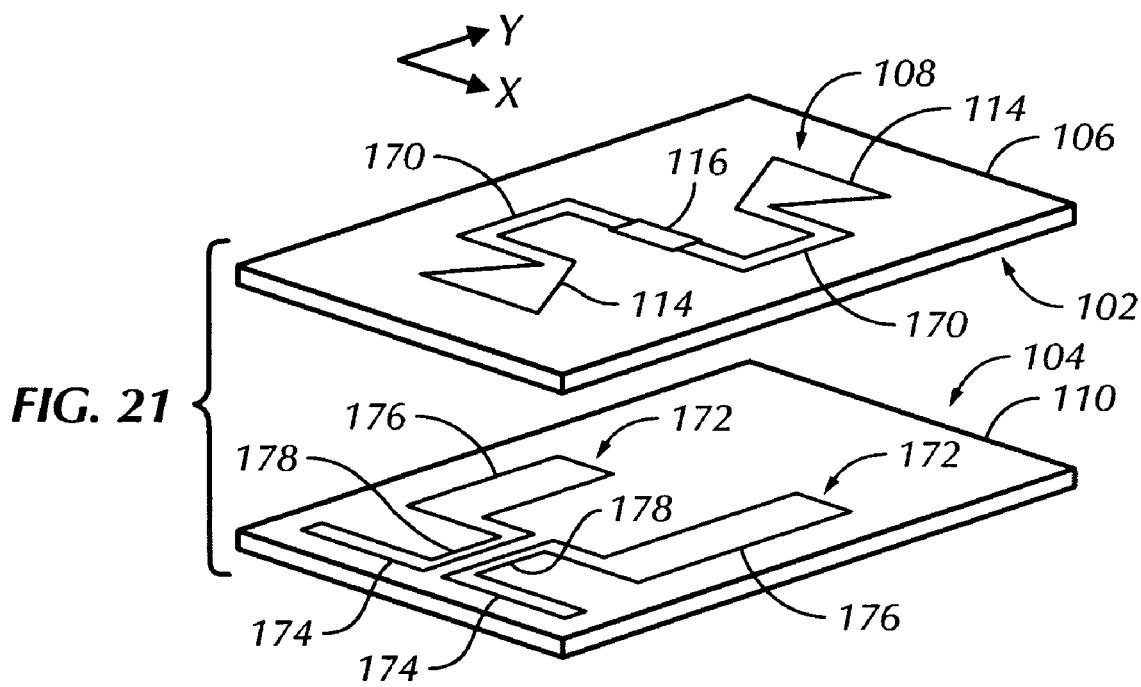
FIG. 21 is an exploded view of the tag of FIG. 20, particularly illustrating a facestock and a liner of the tag.

Other exemplary embodiments of an RFID tag 100 are illustrated in FIGS. 20 and 21 in which the liner 104 is configured to enhance the coupling of energy from an antenna (such as might occur in a printer) positioned orthogonally to the normal direction of propagation or radiation of the antenna of the RFID circuit. More specifically, the facestock 102 may include a substrate 106 with an RFID circuit 108 inlayed thereon. The circuit 108 may include an RFID chip 116 positioned between a pair of antennas 114 and connected thereto with transmission lines 170. The antennas 114 of the embodiment illustrated are as designed to propagate or radiate, to receive or detect, RF energy efficiently along an axis labeled y in the figures (i.e., a normal direction of propagation/receipt of the antennas), but not designed to propagate or receive RF energy efficiently along an axis orthogonal to they axis, i.e., along an axis labeled x in FIGS. 20 and 21 (i.e., an orthogonal direction of propagation/receipt).

To enhance orthogonal propagation and receipt, the liner 104 may include one or more electrical elements 172 inlayed, printed, etched, adhered to, or otherwise disposed upon a substrate 110. Each of the electrical elements 172 may include an antenna element 174 and a coupling element 176 connected thereto by transmission lines 178. When the liner 104 is attached to the facestock 102 as shown in FIG. 20, the coupling elements 176 are respectively spatially juxtaposed with the transmission lines 170 of the RFID circuit 108. The antenna elements 174 then receive and transmit RF energy in the orthogonal direction (i.e., along the x axis), which energy is then coupled to or from the RFID circuit via the coupling elements 176 and the transmission lines 170. Accordingly, in printer environments, for example, the RFID tag 100 may be read and checked prior to printing on the facestock substrate 106. When the liner 104 is removed from the facestock 102, the RFID circuit 108 reverts to its normal operating parameters and characteristics.

Depending on the intended end use, the RFID tags 100 may be configured as roll labels or, alternatively, as sheet labels. In roll-label embodiments, a manufacturer of a particular product may apply the RFID tags 100 automatically to the actual product or to packaging for the product. Those skilled in the art understand that there are many known techniques for removing labels from rolls and automatically applying those labels to items. An example of a roll-label embodiment is illustrated in FIG. 9.

Figure 22:
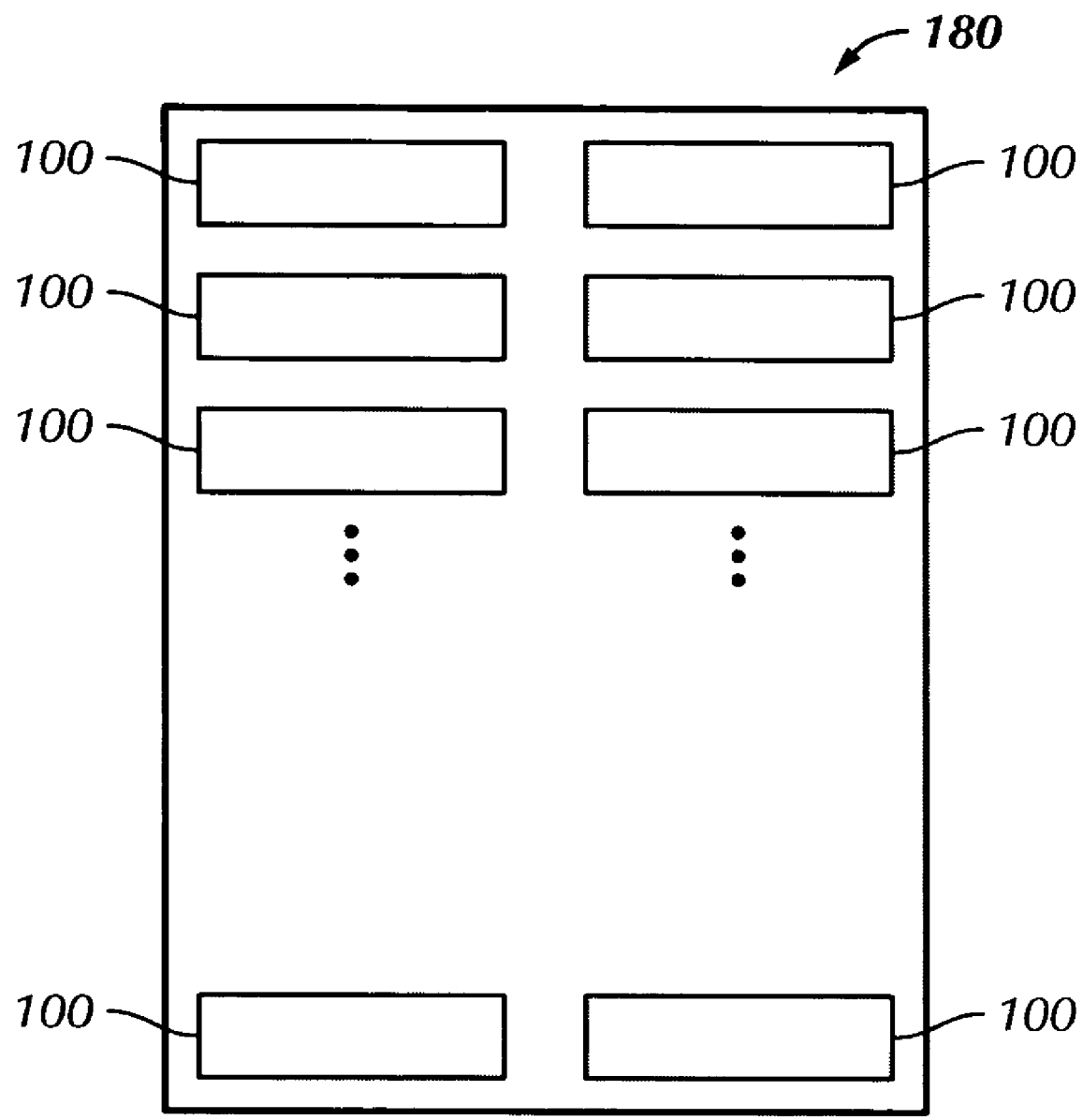
FIG. 22 is a plan view of a label sheet with a plurality of RFID tags according to a number of embodiments.

In label-sheet embodiments such as shown in FIG. 22, a label sheet 180 including a plurality of RFID tags 100 may be configured for use with conventional small-office, home-office (SOHO) or desk-top printers, or, alternatively, for use with sheet-fed high-speed industrial printers. Accordingly, an end user may print desired text and/or graphics on the facestock substrate 106 (not shown in FIG. 22; see, e.g., FIG. 1), remove the labels 100 from the sheet 180, and apply the labels 100 to items as desired.

Figure 23:
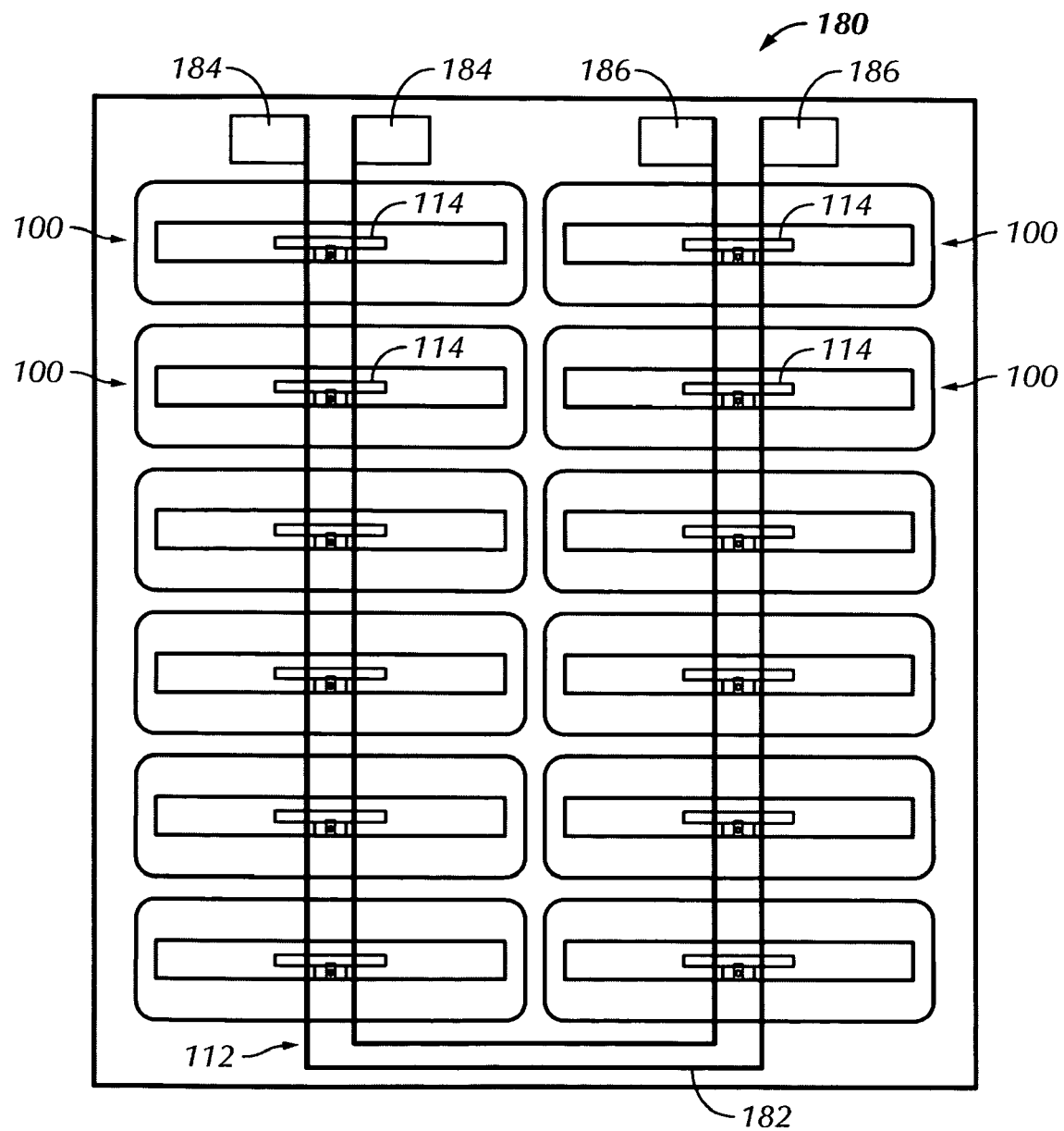
FIG. 23 is a plan view of a sheet of dual-state RFID labels according to other embodiments.

In a number of embodiments as shown in FIG. 23, a label sheet 180 with a plurality of labels 100 may include the electrical element 112 in the form of a transmission line 182 in the release liner 104. The transmission line 182 is able to electrically couple all of the labels 100 together by proximity coupling. Accordingly, the transmission line 182 enables the labels 100 to operate at a short range and provides the electrical coupling mechanism that enables the labels 100 to be grouped together. Therefore, a reader or a printer is able to read all the labels 100 at one time and simultaneously by coupling energy into and driving the transmission line 182, for example, at terminals 184. Another set of terminals 186 of the transmission line 182 may be utilized by a reader or a printer to apply a resistive terminating load to the line 182. Rather than placing the sheet 180 in the presence of a far-field reader, the drive terminals 182 may be utilized by a hand-held, near-field coupler to drive and read the entire sheet 180 of labels 100.

The label sheet 180 with a plurality of modifiable RFID labels 100 coupled to a release liner 104 can be employed in a number of commercial applications. For example, in a medical application, each of the labels 100 of a label sheet 180 can be associated with a particular patient. The release liner 104 with the electrical elements 112 reduces the read range of the labels 100 such that the labels 100 can be read only at a close range, e.g., inside a printer. Accordingly, users can ensure that only tags 100 that have been removed from the label sheet 180 can be read at a greater read range when applied to such items as medical folders, test samples, and so on.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A radio-frequency identification (RFID) tag comprising: a facestock including an RFID circuit with an operating parameter; and a liner releasably attached to the facestock such that when the liner is detached from the facestock, the operating parameter of the RFID circuit is changed.

2. The RFID tag of claim 1 wherein the liner includes an electrical element that modifies the operating parameter of the RFID circuit when the liner is attached to the facestock.

3. The RFID tag of claim 2 wherein the RFID circuit includes an antenna, the electrical element electrically coupling with the antenna when the liner is attached to the facestock.

4. The RFID tag of claim 3 wherein the electrical element couples with the antenna to modify a read range of the RFID circuit, such that the read range is decreased when the liner is attached to the facestock and the read range is increased when the liner is detached from the facestock.

5. The RFID tag of claim 3 wherein the electrical element couples with the antenna to modify a direction of signal propagation of or receipt by the RFID circuit.

6. The RFID tag of claim 1 wherein the facestock includes a plurality of the RFID circuits.

7. The RFID tag of claim 6 wherein the liner includes a plurality of electrical elements operably juxtaposed with the RFID circuits such that the electrical elements modify the operating parameter of the RFID circuits when in the liner is attached to the facestock.

8. The RFID tag of claim 6 wherein the liner includes an elongate electrical element that is operably juxtaposed with each of the RFID circuits such that the electrical element modifies the operating parameter of the RFID circuits when the liner is attached to the facestock.

9. The RFID tag of claim 6 wherein the liner includes a transmission line that is operably juxtaposed with each of the RFID circuits such that the transmission line electrically couples with each of the RFID circuits to modify the operating parameter thereof.

10. A radio-frequency identification (RFID) tag comprising: a facestock including an RFID circuit; and a liner releasably attached to the facestock and including an electrical element for modifying an electrical characteristic of the RFID circuit such that the RFID circuit has: a first read range when the liner is attached to the facestock; and a second read range when the liner is detached from the facestock.

11. The RFID tag of claim 10 wherein the first read range is less than about 1 meter, and the second read range is at least about 2 meters.

12. The RFID tag of claim 10 wherein the first read range is less than about 10 centimeters, and the second read range is at least about 4 meters.

13. The RFID tag of claim 10 wherein the RFID circuit includes an antenna; the electrical element inhibiting energy radiated by the antenna when the liner is attached to the facestock.

14. The RFID tag of claim 10 wherein the electrical element electrically couples with the antenna when the liner is attached to the facestock.

15. The RFID tag of claim 10 wherein the electrical element detunes the antenna when the liner is attached to the facestock.

16. The RFID tag of claim 10 wherein the electrical element includes a conductive material.

17. The RFID tag of claim 10 wherein the electrical element includes a dielectric material.

18. The RFID tag of claim 10 wherein the electrical element includes a material having a high magnetic permeability.

19. The RFID tag of claim 10 wherein the electrical element is a conductive ink.

20. The RFID tag of claim 10 wherein the electrical element is spatially juxtaposed over a portion of the antenna.

21. The RFID tag of claim 10 wherein the electrical element is spatially juxtaposed over the entire antenna.

22. The RFID tag of claim 10 wherein the facestock includes a plurality of the RFID circuits.

23. The RFID tag of claim 22 wherein the liner includes a plurality of electrical elements operably juxtaposed with the RFID circuits such that the electrical elements modify the electrical characteristic of the RFID circuits.

24. The RFID tag of claim 22 wherein the liner includes an elongate electrical element that is operably juxtaposed with each of the RFID circuits such that the electrical element modifies the electrical characteristic of the RFID circuits.

25. The RFID tag of claim 22 wherein the liner includes a transmission line that is operably juxtaposed with each of the RFID circuits such that the transmission line electrically couples with each of the RFID circuits to modify the electrical characteristic thereof.

26. A radio-frequency identification (RFID) tag comprising: a facestock including an RFID circuit with an antenna for receiving energy along a first axis; and a liner releasably attached to the facestock and including an electrical element for modifying an electrical characteristic of the RFID circuit such that the RFID circuit is able to receive and transmit energy along: the first axis and a second axis that is substantially orthogonal to the first axis when the liner is attached to the facestock; and the first axis when the liner is detached from the facestock.

27. The RFID tag of claim 26 wherein: the RFID circuit includes an RFID chip connected to the antenna with a transmission line; the electrical element includes an antenna element for receiving and radiating RF energy along the second axis and a coupling element spatially juxtaposed with the transmission line of the RFID circuit; and the coupling element couples RF energy between the antenna element and the RFID circuit through the transmission line.

28. The RFID tag of claim 26 wherein the electrical element includes a conductive material.

29. A method of fabricating an RFID tag, the method comprising: providing a facestock web including a facestock substrate and an adhesive layer; providing an inlay web including an inlay substrate with an RFID inlay including a plurality of RFID circuits; providing a liner web including a liner substrate with an electrical inlay including a plurality of electrical elements, and a pressure sensitive adhesive layer; and sandwiching the inlay web between the adhesive layers of the facestock and liner webs such that the electrical elements are respectively spatially juxtaposed with at least a portion of the RFID circuits, the liner web being releasably attached to the facestock.

30. The method of claim 29 wherein the facestock web and the liner web each includes a temporary liner, further comprising: separating the temporary liners from the webs prior to the sandwiching step.

31. The method of claim 29 further comprising: cutting the facestock substrate to form a plurality of RFID tags each including one of the RFID circuits and at least one of the electrical elements, a given electrical element for a given RFID circuit modifying an operating parameter of the RFID circuit, such that the RFID circuit has a first read range when the liner is attached to the facestock and a second read range when the liner is detached from the facestock, the second read range being greater than the first read range.

32. The method of claim 29 further comprising: printing the electrical inlay onto the liner substrate.

33. The method of claim 29 wherein the electrical inlay is printed with conductive ink.

\* \* \* \* \*